April 15, 1947. H. L. PITT 2,419,161
MEANS FOR CONTROLLING AEROPLANES WHEN IN FLIGHT
Filed Aug. 27, 1943 5 Sheets-Sheet 3
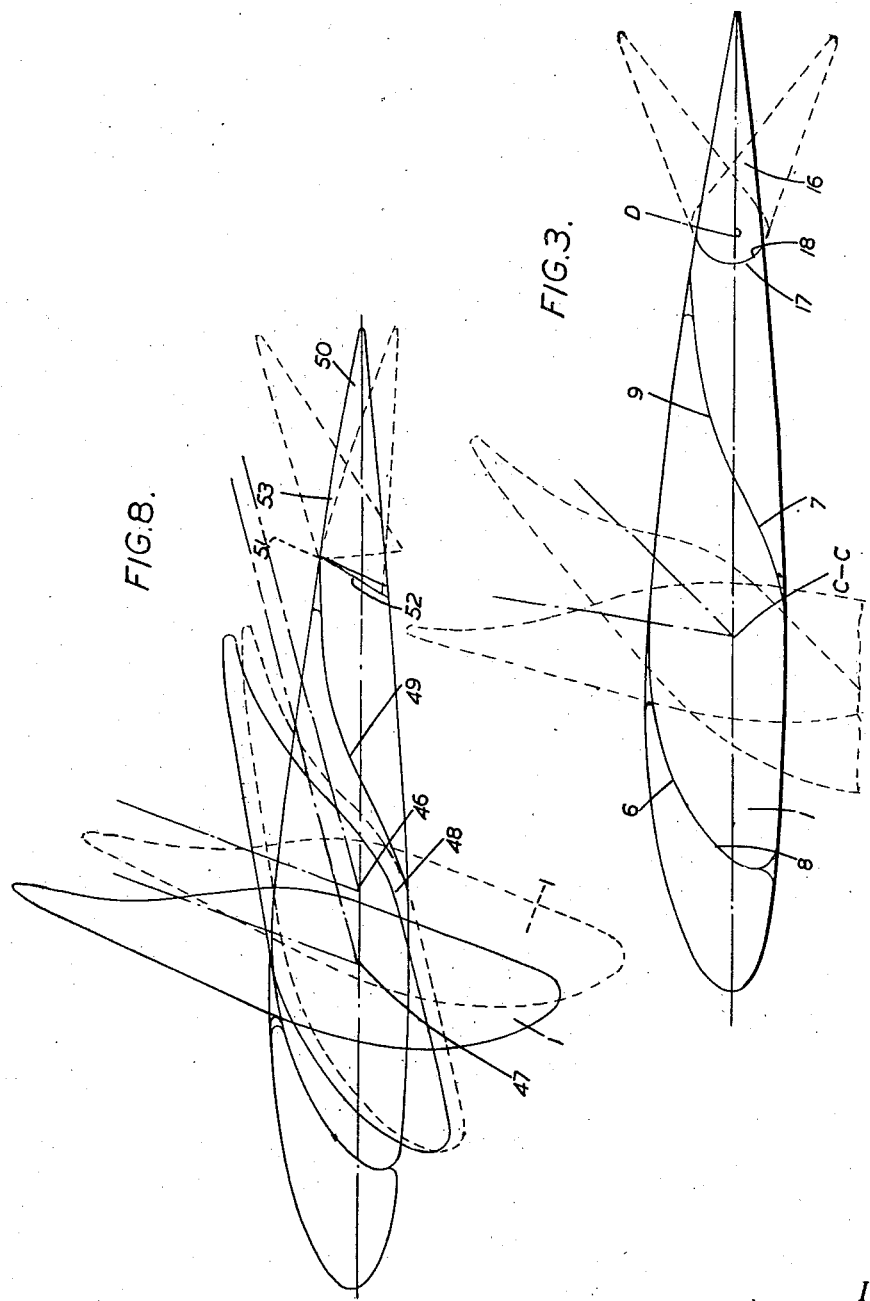
Inventor
HUBERT LEWELLEN PITT
By
Attorney Inventor
HUBERT LEWELLEN PITT

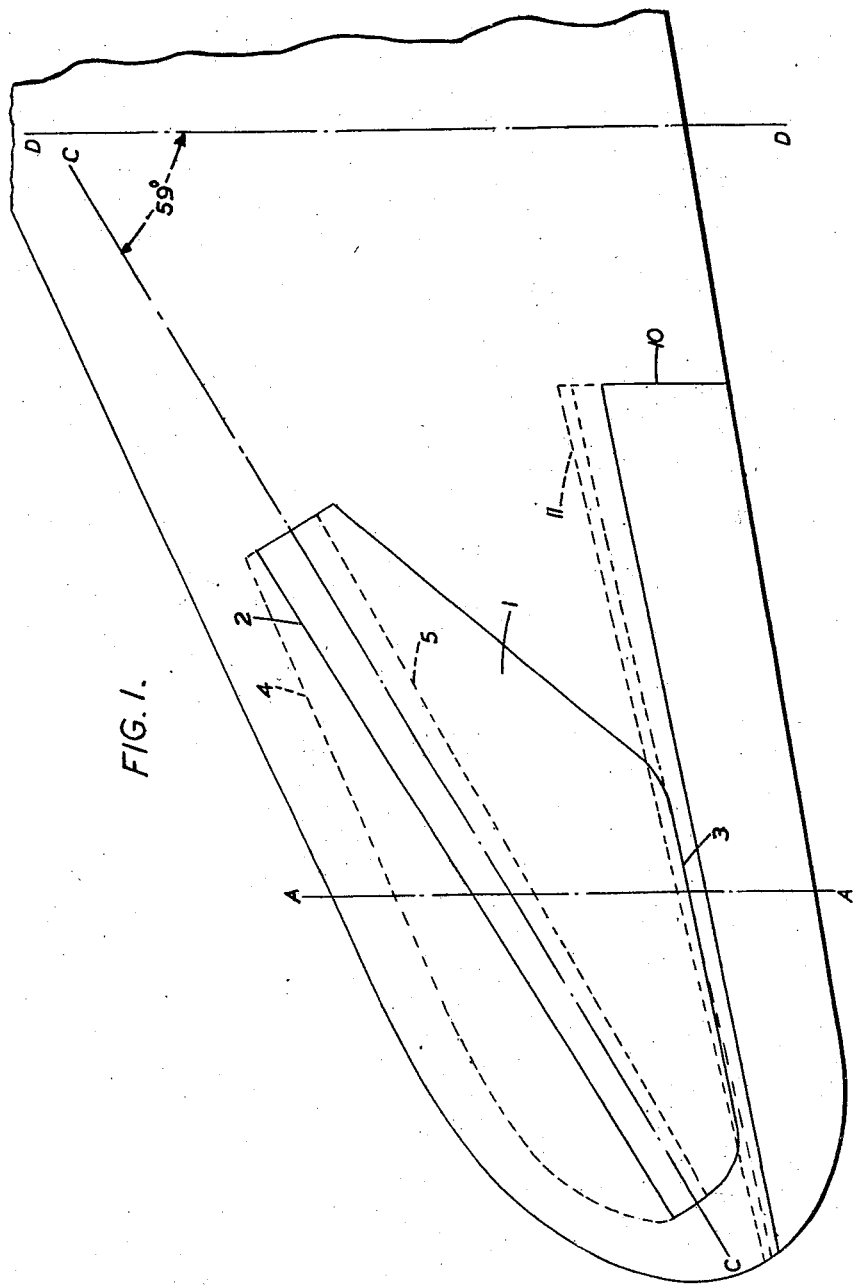

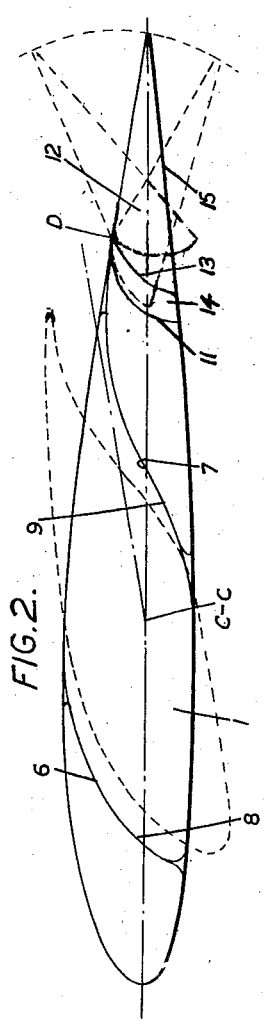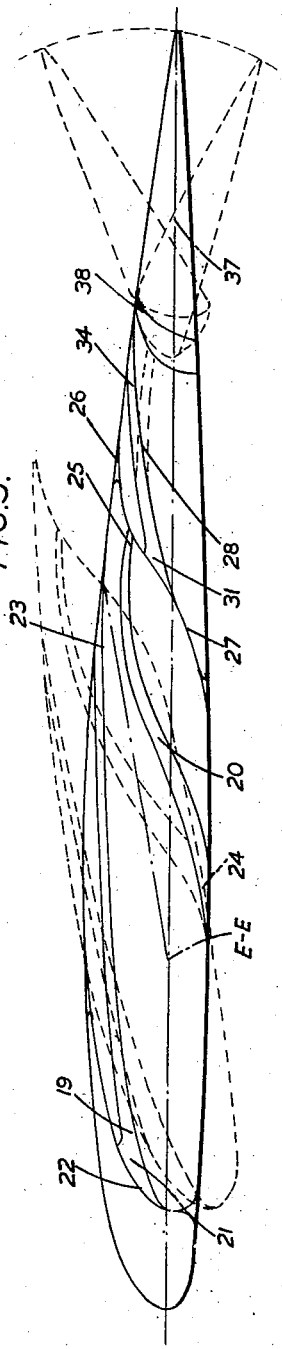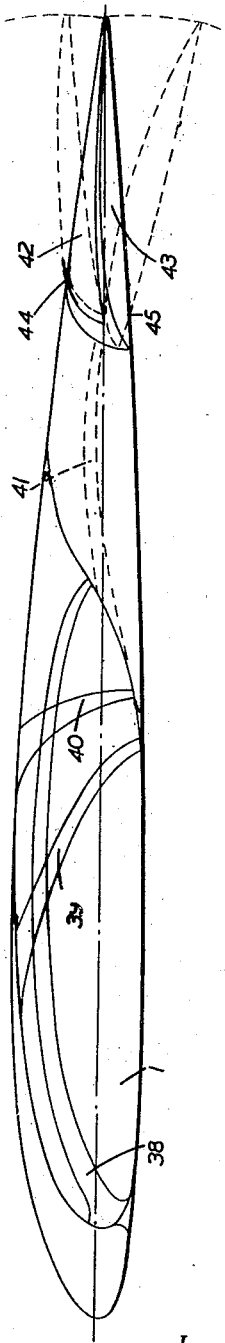

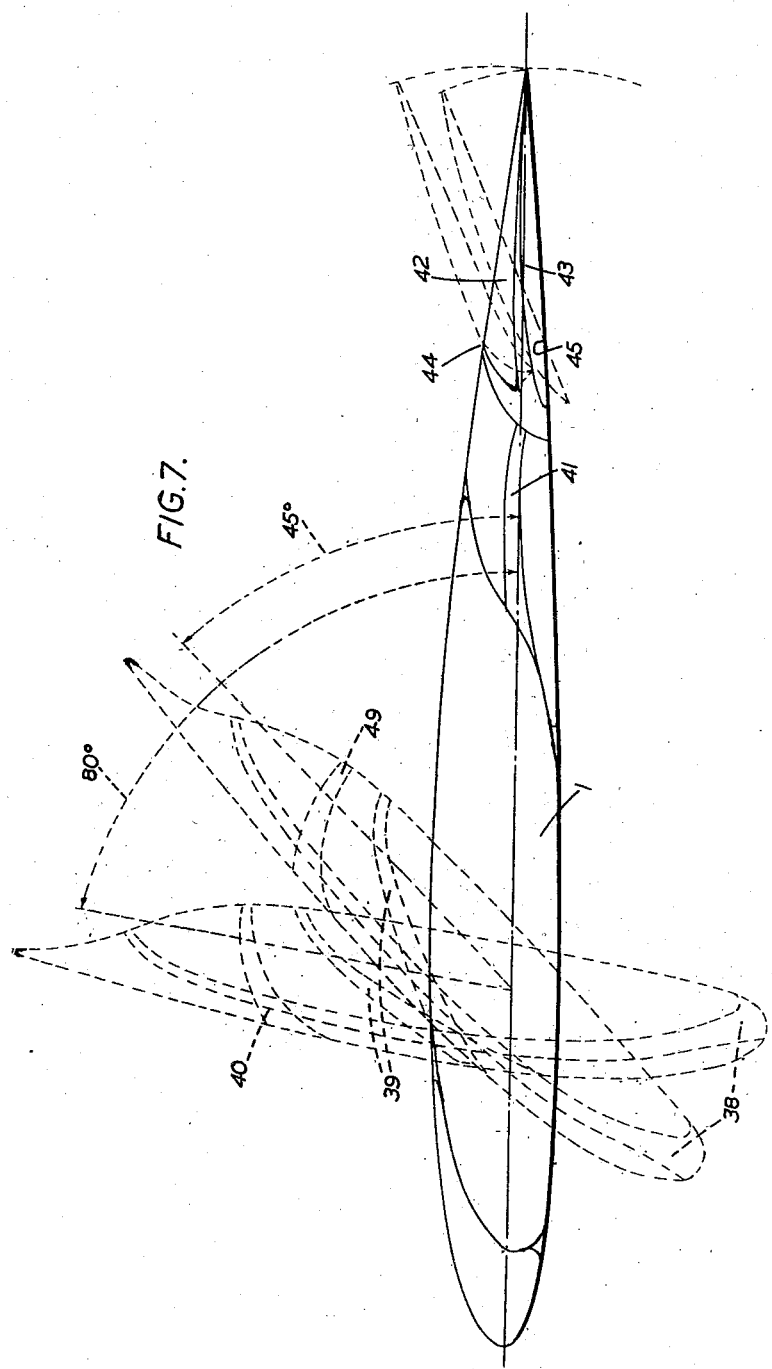

UNITED STATES PATENT OFFICE 2,419,161

MEANS FOR CONTROLLING AEROPLANES WHEN IN FLIGHT

Hubert Lewellen Pitt, Bromley, England

Application August 27, 1943, Serial No. 500,196
In Great Britain July 3, 1942

19 Claims. (Cl. 244—42)

The object of this invention is to improve or modify the aeroplane described and claimed in the specification of my Patent No. 2,111,481, that is to say an aeroplane of the type comprising control surfaces each of which is not greater in area than half the area of the wing at one side of the machine and is mounted in an orifice formed in the wing between the leading and trailing edges of the latter, the control surface being solid in construction and adapted to be turned relatively to said orifice on an axis which is directed forwardly and inclined to the longitudinal axis of the aircraft at an angle which is less than 90° to said axis, said control surface also being so constructed and arranged that when turned from its inoperative position, its leading edge projects downwards and forwards towards the leading edge of the wing whilst its trailing edge projects rearwards and upwards, whereby air from the underside of the wing is caused to flow both over the top surface and over the underside of the control surface rearwards or mainly rearwards and upwards through the orifice in the wing, thereby causing either a destruction of lift, pressure loss at the wing tip and negative pressure, or an increase of lift, according to the degree of opening of the orifice by the control surface and the relative velocity of the airstream caused to flow through the orifice and past the control surface, and thereby affecting a redistribution of pressure between the lower and upper wing surfaces through the orifice in which the control surface is disposed. The said control surfaces will be termed "control-stabilisers" in the following description.

For reasons which are referred to hereinafter, I have found that in certain circumstances, it is of advantage to provide an aeroplane fitted with my control-stabilisers with additional control surfaces turnably arranged at the trailing edges of the wings aft of the orifices in which the control-stabilisers are turnable.

Such an additional control surface takes the form of a balanced, partially-balanced or unbalanced trailing edge flap turnable in a recess formed in the trailing edge of the wing and arranged, according to circumstances, to act as a trailing edge flap, aileron or elevator. For brevity, however, this control surface will be referred to hereinafter as a "flap." The flaps may be adapted to be pivoted upwards or upwards and downwards and also differentially, i. e., the upward movement of one flap may be greater than the downward movement of the other or the upward (or downward) movement of one may be greater than the upward (or downward) movement of the other.

When my control-stabiliser is used in the form which produces a lift increase for the first few degrees of its opening, it is of advantage to use the flap in association with it because the effect of lift increase may be to cause a change of trim of the aircraft about the pitching axis. This may be sufficient to put the nose down and would amount to a reversal of pitching moment. The pitching moment necessary to correct this disadvantage is provided by raising the flap, the effectiveness of the latter, in varying conditions, being determined by the angle of opening of the control-stabiliser and, therefore, the airflow through the orifice in the wing. This combination of control-stabiliser and flap maintains most of the advantages of the orthodox trailing edge flap on tailless aircraft while overcoming most of its characteristic defects.

When the control-stabilisers take over foolproof control and stability of the aircraft strictly limited to essential safe manoeuvres for emergency landing or blind flying, the flaps need not be called upon to act except as surfaces for increasing lift and/or drag, although in certain cases they may be called upon, even in landing, to assist in maintaining longitudinal trim if, throughout the range of movement of the control-stabilisers, the centres of pressure are not constant. If the control stabiliser is opened to such a degree that the air flow is broken up or diverted to such an extent that the trailing edge flaps cannot act as ailerons or elevators, they may still act as landing flaps if necessary.

For sensitive fine angle and skilled control and manoeuvrability for high speed, the control-stabilisers can be faired into the wings and use made of the flaps as elevators and ailerons, since the lift increasing quality of the control stabilisers when open the first few degrees would effect a reversal of aileron moment at such fine angles of trim if used by themselves as ailerons. Therefore they do not perform this function unaided by the flaps unless and until they have opened beyond those degrees which will produce an increase of lift.

It is known that at high angles of attack wings of tapered and swept back form tend to stall at the wing tips first and such stalling is caused by a separation of the air flow from the tip surface. In many conventional aircraft this results in loss of lateral control and is sometimes followed by loss of directional and longitudinal control particularly in tailless aircraft. The slots formed by the opening of my control stabiliser therefore tend to prevent such stalling of the wing tip and to maintain control not only in themselves but through the increased efficiency of the flaps due to the improved nature of the flow in which they operate. Furthermore the effect of such slots is to delay the stalling angle of the main wing or at least to render such stalling more gradual and innocuous.

When the control-stabilisers are turned through, say approximately 10 degrees, the air flow over the wing tip and particularly over the upper surface of the flap is therefore improved and the flap is rendered more effective. As the effect upon the flaps of the air flow through the slots formed by opening the control-stabilisers is particularly noticeable at high angles of attack, the aircraft is able to cruise at very slow speeds under safe control and with inherent damping about all axes, amplified by the open slots. With the control-stabilisers at the said setting (approximately 10° opening) the flaps will have a full range of movement capable of maximum control, and their effectiveness will be increased by the improved flow through the slots created by the control stabilisers even at angles of attack below maximum lift. It will be understood that the said angle of 10° is only mentioned by way of example and that it will vary with circumstances and lay out.

As mentioned in my said specification, the control-stabilisers may have a differential action: that is to say, one may be adapted to open through a greater angle than the other. If so desired, the flaps may also be arranged to turn in opposite directions and this movement may be differential, i. e., the upward movement greater than the downward movement.

Trailing edge flaps according to this invention may be of smaller area than is customary, and the flaps may lack the dangerous features usually accompanying the use of orthodox flaps, such as adverse yawing moments, adverse pitching moments when used as ailerons, or too much or too little power in pitch, yet they will not be underpowered at low speeds or high angles of attack of the wing. Combined with my control-stabilisers they have unique characteristics not possessed by other similar types of control surfaces.

Constructional forms of the invention as applied to a tailless aeroplane with sweptback wings are hereinafter described, by way of example, with reference to the accompanying drawings, whereon:

Fig. 1 is a plan view of the tip end of a wing fitted with a non-slotted stabiliser and a flap;

Fig. 2 is a section on the line A—A in Fig. 1:

Fig. 3 is a view similar to Figure 2 but showing a different form of flap;

Fig. 5 is a section on the line B—B in Fig. 4;

Fig. 6 is a sectional view of a wing provided with a split type flap and a slotted control stabiliser;

Fig. 7 is a view corresponding to Fig. 6 but showing the stabiliser turned into two different open positions; and Fig. 8 is a sectional view of another arrangement and shows the effect on the shape of the slots, in a wing having a control stabiliser, of varying the position of the axis about which the control-stabiliser is turnable.

Figure 4:
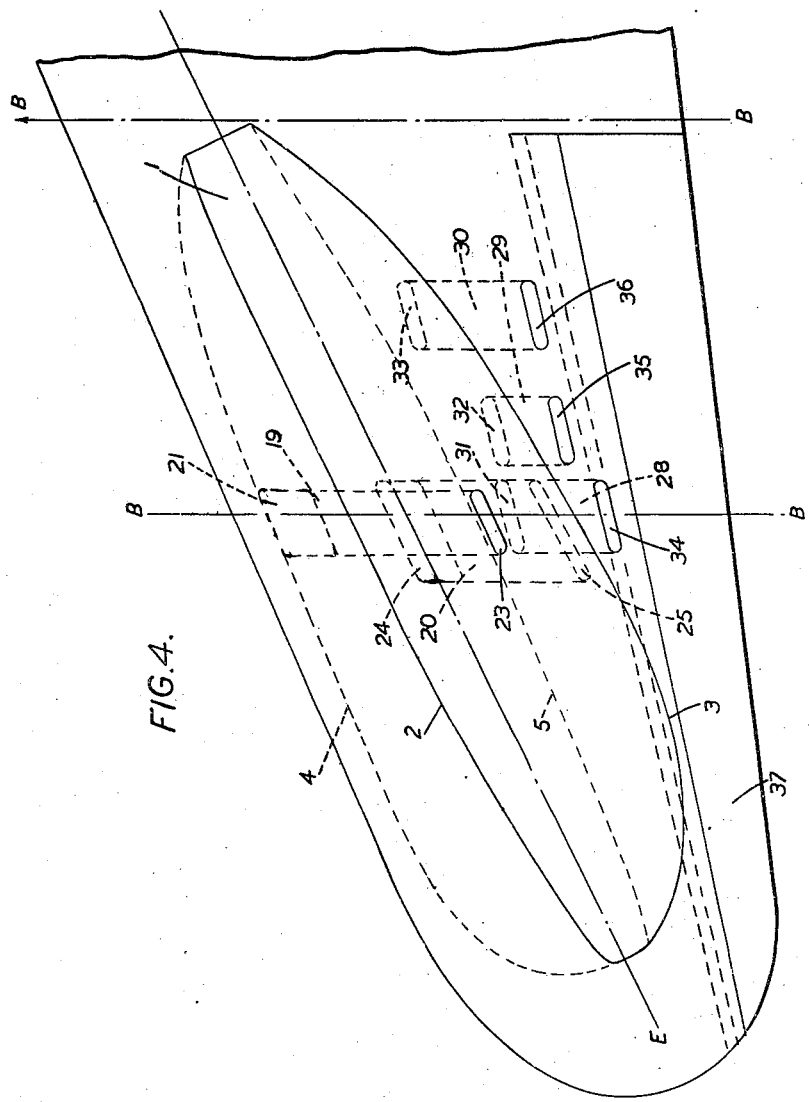
Fig. 4 is a plan view of the tip end of a wing fitted with a slotted stabiliser.

Referring first to Figs. 1 and 2, Fig. 1 shows in fragmentary plan view the wing tip end of a swept-back wing fitted to an aeroplane of the tailless type. In this construction, the control stabiliser 1 is arranged to turn with its leading edge downwardly and its trailing edge upwardly, see Fig. 2, about an axis C—C which is arranged at an angle of about 59° to the datum line of flight D—D. As shown in Fig. 1, the front and rear top edges 2 and 3 of the orifice in the wing in which the stabiliser is turnable are nearer to the trailing edge of the wing than the front and rear bottom edges 4 and 5. The stabiliser is of the non-slotted type, that is to say it is not formed with slots as described in the specification of my co-pending application Serial No. 500,195.

The front wall 6 of the orifice is curved rearwardly and upwardly from bottom to top as shown in Fig. 2 and the rear wall 7 is formed with a double curve extending rearwardly and upwardly. Thus, the part of the wing aft of the rear wall is of substantially triangular section, the section varying along the span of the wing. The front and rear edges 8 and 9 and the ends of the control-stabiliser are shaped to fit accurately in the front and rear walls 6 and 7 and in the ends of said orifice when the stabiliser is closed, in which position the top and bottom surfaces of the stabiliser are faired with the top and bottom surfaces of the wing. When the stabiliser is turned about its axis C—C, however, air from below the wing can flow above it through the front and rear slots formed respectively between the walls 6 and 8 and the walls 7 and 9, see the broken lines in Fig. 2.

A recess 10 is formed in the trailing edge of the wing which is slightly longer than the span of the control-stabilizer in this case, and which terminates in the wing tip while the outer end of the stabilizer terminates short of the wing tip as shown in Fig. 1. The recess is substantially triangular in section, its front wall 11 being provided by a curved recess, formed in the wing adjacent to the rear wall 7 of the said orifice.

The flap 12, Fig. 2 is of the slotted or partially-balanced type. The upper surface of the flap is curved at the front edge 13 to such a radius that a gap or slot 14 is left between the said edge and the curved part 11 of the recess in the wing when the flap is neutral. Fig. 2 shows in full lines the position of the edge 13 when the flap is in the neutral position. The rest of the upper surface of the flap is shaped to fair with the upper surface of the wing when the flap is in the neutral position. The bottom surface 15 of the flap is also shaped to fair with the bottom surface of the wing when the flap is in the neutral position. In this construction, the flap is turnable about an axis D which is disposed above or in the flap in the front part of the recess 11 in the wing and at the top of the curved part of the latter, slightly to the rear of the rear wall 7 of the orifice in which the control stabilizer is fitted. In this construction, the flap can be turned upwards about its axis D, through a greater angle than it can be turned down, i. e., for example, through a maximum angle of say 15° or 20° downwards from its neutral position and, say, 35° or more upwards.

If advisable, however, in an alternative design, the flap may be so designed that it can be turned upward only and use made of the adverse pitching moment derived from the aforementioned lift increase provided by the slots formed by the initial degrees of opening of the stabilizer, as a means of depressing the nose.

Fig. 3 is similar to Figure 2 but with a different form of flap 16. In this construction the front wall 17 of the recess in the wing is substantially semi-circular and the rear wall 18 of the flap is curved to correspond. The flap is pivoted about the axis D and is arranged to be turned upwards and downwards any required number of degrees. The positions of the flap in its upward and downward adjusted positions, for example, 30° each way, are shown respectively in broken lines in Fig. 3. The figure also shows the control stabilizer when turned through both 45° and 80° from its closed position.

In most constructions, the flap is effective in association with the control-stabilizer as long as the latter is not turned beyond a predetermined and relatively small angle, see Fig. 2 in which the stabilizer has been turned through 10°, the air flow which then takes place upwards through the slot formed through the wing at the rear of the stabilizer being directed on to the flap. At wide openings of the stabilizer, e. g., from 45 to 90 degrees, see Fig. 3, the air flow will be progressively broken up and deflected from the flap and the latter gradually deprived of its power, except where the slotted control stabilizer is used, particularly as in Figs. 6 and 7, referred to hereinafter, when the flow is modified.

Figs. 4 and 5 show the combination of a slotted or partially balanced flap with a slotted control stabilizer as described and claimed in the specification of my said co-pending application Serial No. 500,195.

In this particular construction, two slots are formed in the control-stabilizer, the front slot 19 being disposed on one side of the axis E—E about which the stabilizer is turnable and the rear slot 20 on the other side thereof. Considered when the stabilizer is closed the inlet end 21 of the front slot 19 is disposed at about one-half of the depth of the section of the wing at the position of the inlet measured from the bottom surface of the wing. The inlet end is closed by the front wall 22 of the orifice in the wing. The slot is slightly curved and extends upwards and rearwardly through the control-stabilizer, its outlet end 23 being permanently open and formed in the top surface of the stabilizer and disposed at a spaced distance from the rear wall of the said orifice.

The inlet end 24 of the rear slot is formed in the bottom surface of the control-stabilizer and is permanently open, see Fig. 5. This slot curves upwardly and rearwardly and its outlet end 25, which is formed in the rear wall 26 of the control-stabilizer, is masked by the rear wall 27 of the orifice when the stabilizer is closed.

This construction is such that the full air flow through both slots is prevented until the control stabilizer has been turned through a predetermined angle, say approximately 10 degrees. For instance, at this angle the rear slot 20 has its outlet end 25 well unmasked whereas full unmasking of the inlet end 21 of the front slot 19 is just beginning, see Fig. 5.

In the construction now being described, three span-wise spaced slots 28, 29 and 30 are also formed in the wing, one of these being shown in section in Fig. 5. The inlet ends 31, 32 and 33 of these slots are formed in the rear wall 27 of the orifice in the wing. The slots slope upwardly and rearwardly and their outlet ends 34, 35 and 36 which are permanently open, are formed in the top surface of the wing at the rear of the rear wall 27 of said orifice. The inlet ends of the slots in the wing are arranged to be fully uncovered when the stabiliser has moved through a predetermined angle, say about 10 degrees. Such slots have been illustrated for clarity in staggered form and located in some cases with their points of entry and of exit out of parallel but it will be understood that they may be placed in any relation to each other to suit both aerodynamic and structural needs. Three types of slots are shown but either or all or more may be used.

Like the flap shown in Fig. 2, the flap 37 is of the slotted or partially-balanced type adapted to turn upwards more than downwards about an axis 38. The flap is shown in full lines in Fig. 5 in its closed position and in broken lines in its maximum upturned and downturned positions.

One of the principal objects of the use of the control stabiliser with various forms of trailing edge flap is to change the nature of the flow over the latter at various angles of attack of the wing and to provide not only variation in the lift/drag ratio but movements of the mean aerodynamic centre to give trim, control and stability especially at steep angles of descent. When the control stabiliser is opened at maximum angles, the effect in general is to break up the flow over the flap so that the control stabiliser takes over control and stability about all axes from the flaps but in cases where the general compromise of the design necessitates, for instance, a tail-down pitching moment, or an increase thereof, or a decrease in the nose-down pitching moment at particular angles of attack such slots as the slots 38, 39 and 40 illustrated in Figs. 6 and 7, or similar arrangements may be used to divert the flow from the high pressure region in front of the control stabiliser and under the leading edge of the wing to the lower pressure region behind the control stabiliser when the latter is opened to the maximum or approximately 45° to 90° and so to divert the flow on to the upper portion of the flap and/or conversely to decrease the volume of flow allowed to reach the under position thereof.

Figures 6 and 7 show this form of control stabiliser in combination with a slot 41 running from the rear wall of the wing orifice to a split type of flap 42, 43, the upper part 42 being adapted to turn about an axis 44 and the lower part 43 about an axis 45. It will be appreciated that the volume of air flow permitted through the slot 41 to the split flaps 42, 43 will be affected by the extent to which the type of slotted stabiliser shown in the figures is used but, of course, such a stabiliser could be used with alternative type of flaps and designed accordingly.

Fig. 8 shows the effect of varying the position of the axis of the control stabiliser between the leading and trailing edges of the wing. For example, if the axis is moved from 46 to 47, the inlet opening 48 between the rear edge of the stabiliser 1 and the rear edge 49 of the orifice is increased and consequently the volume of air permitted to flow through the said opening and over the upper surface of the upturned flap is increased while a less volume flows over the under surface of the flap when the latter is turned downward. The reverse takes place when the axis is moved from one position nearer to the trailing edge of the wing.

Furthermore, the width and shape of the front orifice is changed so that in the case of the axis 46 the front slot effect, i. e., the wide inlet and narrow outlet is increased especially at increased setting of the control stabiliser. Such variations can have an important effect upon movement of the centre of pressure in controlling the airflow.

Fig. 8 also shows a different type of flap 50, which is turnable both upwards and downwards about an axis 51 arranged near the junction of its rear edge 52 and upper surface 53. The flap is shown in its neutral position in full lines and in its upturned and downturned positions in broken lines.

As previously mentioned, at high angles of attack wings of tapered and/or swept-back form tend to stall at the tips first and such stalling is caused by separation of the airflow from the tip surface, and in many conventional aircraft this results in loss of lateral control sometimes followed by loss of directional and longitudinal control particularly in tailless aircraft. The additional slots of a slotted control stabiliser tend to create jet pressure on the upper surface deflected downward by passing air from the high pressure under surface and thereby increase lift or prolong the stalling angle or flatten the lift curve, i. e., reduce the slope thereof beyond normal stalling angle or angle of maximum lift.

Furthermore, by such means the flow is directed downward towards the trailing edge flap which is then rendered more effective in its raised position at all angles and its adverse effects when lowered are reduced since the large part of the flow over the lower surface is reduced.

The mechanism for operating the flaps may be so arranged that both flaps can be moved upwards and downwards simultaneously or independently and so that one flap can be moved upwards and the other downwards and differentially. Such mechanism can also be combined with the mechanism for actuating the control-stabilisers, so that the latter and the flaps can be actuated simultaneously and in the desired direction by one control movement.

Reference is made above to the control surface not being greater in area than half the area of the wing. In the case of a continuous wing not interrupted by the fuselage the expression "half the area of the wing," means that portion of the wing projecting outwards, on the port or starboard side as the case may be, beyond the adjacent outer surface or the level of the adjacent outer surface of the fuselage.

The term "aeroplane" is of course intended to cover non-power driven and power-driven gliders and although the invention has been described above with reference to an aeroplane of the tailless type, to which the invention is particularly applicable, it is also applicable to aeroplanes having tails and to aeroplanes having the normal controls, viz., ailerons, elevators and rudders and also to continuous, non-interrupted wings. The invention will be capable of development as a means of steepening the glide and increasing the take-off lift of heavy bombing or transport aircraft, and in particular it will lend itself to the improvement in the control, stability, gliding and climbing angle of seaplanes of the central hull or flying boat type, which would thus be able to dispense with the usual tail and control surfaces. The invention will also be found to be of considerable importance in the stabilizing of model aeroplanes and gliders, keeping them on an even keel and ensuring efficient directional longitudinal and lateral control.

Two or more control stabilisers may be arranged in each wing tip end part of a wing and a trailing edge flap may be associated with each such stabiliser or, if the arrangement of the stabilisers permits it, a single flap may be provided to operate in conjunction with the associated stabilisers in each wing tip end part.

By the use of my improved construction, comprising the stabilisers pivotally mounted in the wing structure, either with or without slots in the stabilisers and the wing parts adjacent to the stabilisers, and with the trailing edge flaps pivotally mounted in position to be effectively acted upon by the air passing through the orifices in which the stabilisers are mounted, I am enabled to control an aeroplane with great facility at any speed of operation desired and with any probable conditions of the weather. When the stabilisers are opened through a very small angle, in the arrangement shown, the aeroplane is enabled to effect high angle climbing, in this operation the stabilisers, the slots, and the flaps being in full cooperation with each other and with the wing structure for effecting the desired results. For turning and banking, the stabilisers can be operated separately, as can also the flaps. For the trim and control of the aeroplane, the stabilisers are peculiarly effective, in part at least, by reason of the fact that they are rotatably mounted on obliquely positioned axes. When the stabilisers are turned beyond their positions of maximum lift, the slots through the stabilisers and the wing are brought into action for permitting air to pass through the wing structure for cutting down the lifting effect without disturbing the trim of the machine and serving thus to prevent any effect by which loss of control might be caused. By the use of my construction, involving the several slots which may be varied in size, position and shape, a great variety of elements are readily available for use by a designer by which he may work out a structure having the desired characteristics.

I claim:

1. Means for controlling an aeroplane in flight, comprising in combination wing defining structure, a control stabiliser not greater in area than half the area of the wing at one side of the aeroplane and mounted in an orifice formed in the wing between the leading and trailing edges of the latter, the control stabiliser being adapted to be turned relatively to said orifice on an axis which is directed forwardly and inclined to the longitudinal axis of the aircraft at an angle which is less than 90° to said longitudinal axis, said stabilizer turning axis being arranged between the leading and trailing edges of the stabiliser so that when the latter is turned from its inoperative position, in which it is faired with the upper and lower surfaces of the wing, into operative positions, its leading edge projects downwards below the lower surface and forwards towards the leading edge of the wing whilst its trailing edge projects upwards above the upper surface of the wing and rearwards whereby air from the underside of the wing is caused to flow both over the top surface and over the underside of the stabiliser through the orifice in the wing, and a trailing edge flap turnably arranged at the trailing edge of the wing structure aft of the control stabiliser, the said flap being adapted to act independently of the stabiliser and alternatively to act as an elevator in cooperation with the stabiliser.

2. A structure of the type described in claim 1 in which the trailing edge flap is mounted in a recess in the trailing edge of the wing.

3. A structure of the type described in claim 1 in which the trailing edge flap is adapted to act as the aileron.

4. A structure of the type described in claim 1 in which the stabiliser is arranged so as to be adapted when opened through only a small angle to direct air backwardly into effective engagement with the flap.

5. A structure of the type described in claim 1 in which the bottom face of the stabiliser at its rear end portion is obliquely disposed with respect to the upper face so as to be adapted when opened through only a small angle to direct air backwardly into effective engagement with the flap.

6. A structure of the type described in claim 1 in which the rear face of the orifice and the bottom face of the stabiliser at its rear end portion are obliquely disposed with respect to the upper face so as to provide between them when opened through only a small angle backwardly and upwardly extending openings for passage of air through the wing structure into effective engagement with the flap.

7. A structure of the type described in claim 1 in which the stabiliser extends at its rear end portion into overlapping relationship to the rear edge portion of the wing so as to be adapted when opened through only a small angle to direct air through the wing structure into effective engagement with the flap.

8. A structure of the type described in claim 1 in which the wing defining structure and the stabiliser are arranged so that when the stabiliser is opened through only a small angle a large amount of air is diverted from the lower surface of the wing to the upper surface and directed into effective engagement with the flap.

9. A structure of the type described in claim 1 in which the flap is adapted to be swung through a range extending from a position well above the plane of the wing to a position well below the plane.

10. A structure of the type described in claim 1 in which there are at least two trailing edge flaps one above the other and are so constructed and arranged to swing in opposite directions.

11. A structure of the type described in claim 1 in which there are at least two trailing edge flaps one above the other and both are so constructed and arranged to swing to any position at an angle to the horizontal from one in which the trailing edges of the flaps are above the horizontal to one in which they are below the horizontal.

12. A structure of the type described in claim 1 in which there are at least two trailing edge flaps one above the other and in which there is a slot in the wing portion to the rear of the stabiliser with its inlet end opening into the orifice in which the stabiliser is mounted so as to be masked by the stabiliser when closed and with its outlet end open at the rear edge of the wing portion and at the forward edges of said flaps.

13. A structure of the type described in claim 1 in which there is a slot in the stabiliser with its inlet end located at the front wall of the stabiliser and permanently open to air flow from below the wing and with its outlet end open at the rear face of the stabiliser so as to be masked by the wing structure when the stabiliser is closed.

14. A structure of the type described in claim 1 in which there is a slot in the stabiliser with its inlet end open at the top surface of the stabiliser in position to be masked by the wing portion in front of the stabiliser when the stabiliser is closed and with its outlet end open permanently at the bottom surface of the stabiliser.

15. A structure of the type described in claim 1 in which there is a slot in the stabiliser with its inlet end permanently open at the top surface of the stabiliser and with its outlet end open at the bottom face of the stabiliser in position to be masked by the wing portion to the rear of the stabiliser when the stabiliser is closed.

16. A structure of the type described in claim 1 in which there is at least one slot in the wing portion to the rear of the stabiliser with its inlet end open into said orifice in position to be masked by the stabiliser when closed and with its outlet end permanently open at the top face of said wing portion.

17. A structure of the type described in claim 1 in which there are a plurality of slots in the wing portion to the rear of the stabiliser with their inlet ends open at different levels into the orifice in which said stabiliser is mounted and in position to be masked by the stabiliser when closed and with their outlet ends open permanently at the top face of said wing portion.

18. A structure of the type described in claim 1 in which there is a slot in the stabiliser with its inlet end open at the bottom face of the stabiliser and with its outlet end open at the rear edge of the stabiliser in position to be masked by the wing portion to the rear of the stabiliser when the stabiliser is closed.

19. A structure of the type described in claim 1 in which there is a slot in the stabiliser with its inlet end open at the front face of the stabiliser in position to be masked by the wing portion in front of the stabiliser when the stabiliser is closed and with its outlet end permanently open at the top surface of the stabiliser.

HUBERT LEWELLEN PITT.

REFERENCES CITED

The following references are of record in the file of this patent:

UNITED STATES PATENTS

| Number | Name | Date |
|---|---|---|
| 2,261,363 | Griswold | Nov. 4, 1941 |
| 2,111,481 | Pitt | Mar. 15, 1938 |
| 2,322,745 | Rogallo | June 29, 1943 |
| 1,857,962 | Lavelle | May 10, 1932 |
| 1,962,411 | Rose | June 12, 1934 |
| 1,890,012 | Alfaro | Dec. 6, 1932 |
| 2,003,223 | Rose | May 28, 1935 |

FOREIGN PATENTS

| Number | Country | Date |
|---|---|---|
| 581,490 | French | Sept. 29, 1924 |
| 356,147 | Italian | Jan. 25, 1938 |